(No Model.) 2 Sheets—Sheet 1.

A. H. MOORE.
Machine for Filling Cans with Meat, Fish, &c.

No. 227,283. Patented May 4, 1880.

Witnesses
Geo. H. Strong.
Frank A. Brooks

Inventor
Asher H. Moore
By Dewey & Co.
Attys (No Model.) 2 Sheets—Sheet 2.

A. H. MOORE.
Machine for Filling Cans with Meat, Fish, &c.

No. 227,283. Patented May 4, 1880.

Witnesses
Geo. H. Strong.
Frank A. Brooks

Inventor
Asher H. Moore
By Dewey & Co.
Attys

UNITED STATES PATENT OFFICE.

ASHER H. MOORE, OF ELLENSBURG, OREGON.

MACHINE FOR FILLING CANS WITH MEAT, FISH, &c.

SPECIFICATION forming part of Letters Patent No. 227,283, dated May 4, 1880.

Application filed March 23, 1880. (No model.)

*To all whom it may concern:*

Be it known that I, ASHER H. MOORE, of Ellensburg, county of Curry, and State of Oregon, have invented certain Improvements in Machines for Filling Cans with Meat, Fish, &c.; and I hereby declare the following to be a full, clear, and exact description thereof.

The object of my invention is to provide a means for mechanically filling the cans in which such articles as fish, meat, and other substances not of a liquid nature are hermetically sealed and preserved and put upon the market.

Usually the fish, meat, or similar article to be preserved, after being cut up or put in the shape in which it is to be preserved, is placed in the cans by hand. It is not always possible to completely fill the can in this way, no special pressure being applied, and, moreover, considerable time is consumed.

The means which I employ to facilitate the operation of filling the cans are such that the meat, fish, or other article, after being cut up in suitably-sized pieces and being placed in a hopper, is forced or fed by a plunger into a mold corresponding in size to the can. A knife then cuts off the mass, and another plunger forces the meat or fish from the mold into the can, which is then removed and sealed, the whole operation being automatically performed, as is more fully described in the accompanying drawings, in which—

Figure 1:
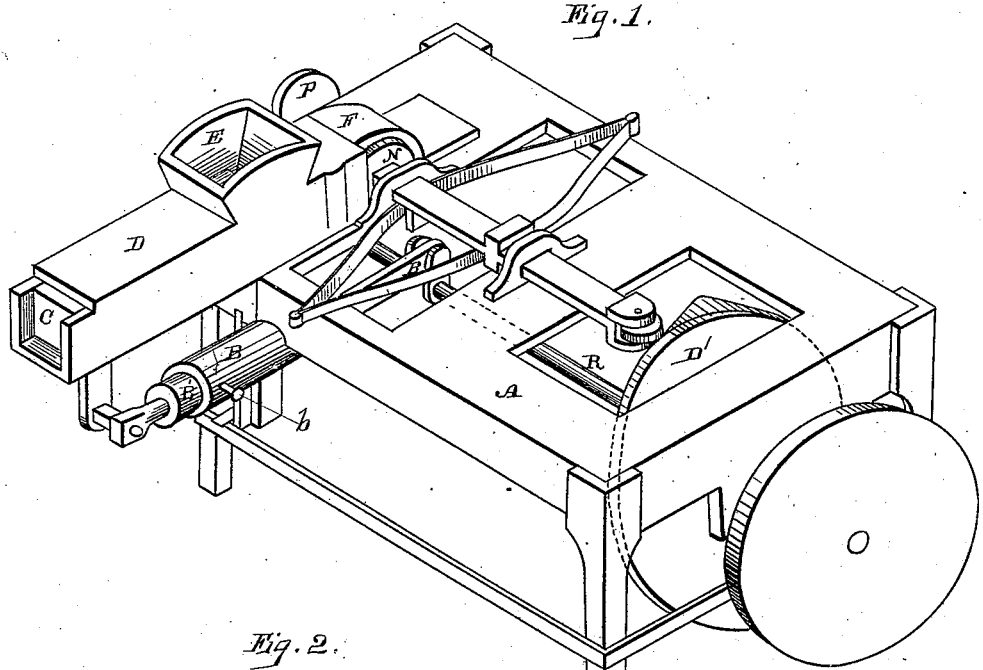
Figure 2:
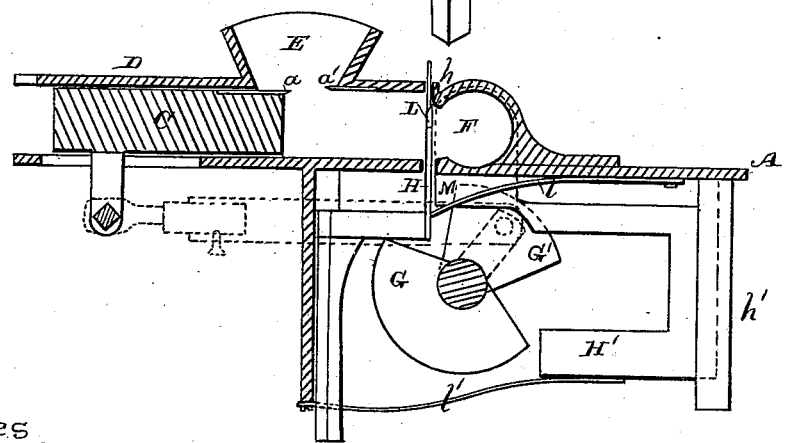
Figure 3:
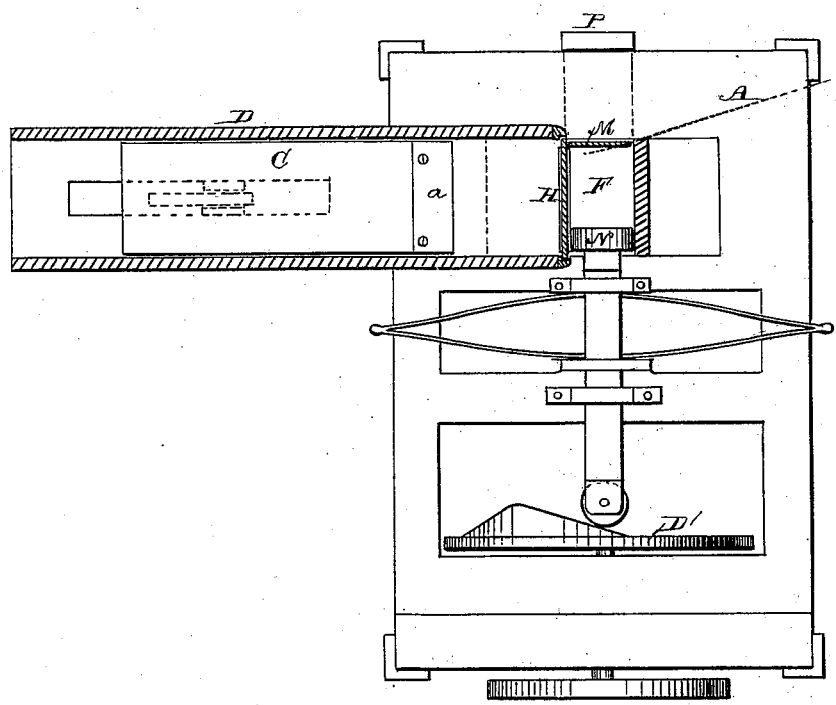

Figure 1 is a perspective view of my apparatus. Fig. 2 is a vertical section. Fig. 3 is a top or plan view.

Under a table, A, suitably supported and braced, is a driving-shaft, R, having a pulley or crank upon its end, by means of which power may be applied to rotate said shaft. On this shaft is a crank operating a pitman, B, connected with a plunger or follower, C, in the feed-box D, said feed-box being provided with a hopper, E, into which the pieces of fish, meat, or other substance to be packed are placed after being cut into pieces of suitable size. The length of stroke, and consequent pressure of the follower, is regulated by the pitman-extension B', which slides in and out of the hollow pitman, and is kept in any desired position by a set-screw, b.

The meat or fish is cut into suitably-sized pieces and is placed in the hopper, through which it drops in proper quantity into the feed-box. As the rotation of the main shaft draws the follower forward this meat or fish is pushed forward by said follower into the mold F, which is placed in front of the feed-box. Knives $a\ a'$ are placed on the upper front edge of the follower and on the lower edge of the hopper, so that as the follower comes forward these knives cut the fish or meat off even with the top of the follower.

The mold is exactly of the same dimensions as the can to be filled, and as soon as the plunger has filled said mold a cam, G, on the main power-shaft forces up a slide, H, moving in a guide, $h$, and carrying a knife, L. This knife cuts up through the meat or fish between the mold and follower, leaving just the proper quantity in the mold to fill the can. The knife continues to move upward until it is interposed between the mold and follower, acting as a gate or door to the feed-box and preventing the entrance into the mold of more than the required quantity. The instant the follower is withdrawn to its outer limit by its crank and pitman this knife L is withdrawn by a spring, $l$, leaving the opening between feed-box and mold free.

At the moment the mold is filled by the follower C and the knife L cuts off the meat or fish, a gate or door, M, which closes the front of the mold, is withdrawn downward by means of a cam, G', which impinges on a slide, H', moving in a guide, $h'$, carrying said door. A spring, $l'$, throws this door or gate up again when the mold is empty, as hereinafter described.

As soon as the mold is filled, the knife or gate L up and the door or gate M down, a side plunger, N, fitting in the mold, is forced forward by the cam-wheel D' and pushes the molded meat or fish into the can. The can to contain the meat or fish is placed with its open mouth immediately in front of the mold, being held there by a stud, P, and as this plunger N comes forward the meat or fish is forced into the can, which is then removed and sealed. A spring, $l'$, then throws the door or gate M up to close the mold, and a spring, $n$, with-draws the plunger N. The follower in the feed-box then pushes forward another lot into the mold, the same operation being repeated.

This apparatus can be worked as slowly or rapidly as desired, it being expected that its speed will be regulated so as to keep one man busily engaged placing and removing cans.

I am thus enabled to fill the cans very rapidly, and each one will contain about the same weight of fish or meat.

The apparatus may be operated by any power applied to the main shaft.

Having thus described my invention, what I claim as new, and desire to secure by Letters Patent, is—

1. In an apparatus for filling cans with solid substances, the receiving-hopper E, by which the substance is directed into the feed-box D, in combination with the stationary knife $a'$ and the movable knife $a$, attached to the reciprocating plunger C, whereby the substance is cut to the proper size and at the same time forced forward into the mold, substantially as herein described.

2. The feed-box D, with its reciprocating plunger C, the cutters $a$ $a'$, and feed-hopper E, in combination with the mold F, with its movable end-gate M, vertically-moving cutter L, and reciprocating plunger C, whereby the substance is forced from the feed-box into the mold, cut to the proper size, and ejected from the mold into the can, substantially as herein described.

3. The can-filling apparatus consisting of the horizontal feed-box D, hopper E, cutting-knives $a$ $a'$, and stationary receiving-mold F, the pitman B B', operated from the main shaft and made adjustable, as shown, whereby the stroke of the plunger in the feed-box is increased or diminished, substantially as and for the purpose herein described.

4. In a can-filling apparatus consisting of the receiving-hopper E, horizontal feed-box D, cutting-knives $a$ $a'$, and plunger C, and the stationary mold F, the plunger N, with its actuating-arm, in combination with the cam D' and the spring, whereby the plunger is alternately forced forward to discharge the substance from the mold, and retracted, substantially as herein described.

5. In a can-filling apparatus consisting of the horizontal feed-box D and reciprocating plunger C, adapted to discharge its contents into a stationary mold, F, from which the material is ejected by a plunger, N, into a can, the adjusting and holding stud P, whereby the can may be placed, filled, and discharged, substantially as herein described.

In witness whereof I have hereunto set my hand.

A. H. MOORE.

Witnesses:
ROBT. WALKER,
RAWLEY SCOTT.